US00RE43355E

(19) United States
(12) Reissued Patent
Martinez de Velasco Cortina et al.

(10) Patent Number: US RE43,355 E
(45) Date of Reissued Patent: May 8, 2012

(54) MULTI-FREQUENCY IDENTIFICATION DEVICE

(75) Inventors: Francisco Martinez de Velasco Cortina, La Jolla, CA (US); Manfred Rietzler, Marktoberdorf (DE)

(73) Assignee: Neology, Inc., Poway, CA (US)

(21) Appl. No.: 12/192,903

(22) Filed: Aug. 15, 2008

Related U.S. Patent Documents

Reissue of:
(64) Patent No.: 7,091,860
Issued: Aug. 15, 2006
Appl. No.: 10/636,732
Filed: Aug. 8, 2003

U.S. Applications:
(60) Provisional application No. 60/401,762, filed on Aug. 8, 2002.

(51) Int. Cl.
*H04Q 5/22* (2006.01)
(52) U.S. Cl. ..... 340/10.1; 340/572.1
(58) Field of Classification Search ..... 340/572.1, 340/540, 10.1
See application file for complete search history.

(56) References Cited

U.S. PATENT DOCUMENTS 5,025,486 A * 6/1991 Klughart ..... 340/3.1
5,235,326 A * 8/1993 Beigel et al. ..... 340/10.41
5,426,667 A 6/1995 Van Zon
5,629,981 A * 5/1997 Nerlikar ..... 713/168
5,940,006 A * 8/1999 MacLellan et al. ..... 340/10.1
6,745,008 B1 * 6/2004 Carrender et al. ..... 455/41.1
2001/0048361 A1 * 12/2001 Mays et al. ..... 340/10.51
2002/0011933 A1 * 1/2002 Andersen et al. ..... 340/572.1
2004/0068631 A1 * 4/2004 Ukeda et al. ..... 711/163

FOREIGN PATENT DOCUMENTS

EP 1209615 5/2002
FR 2779847 12/1999
WO WO 97 24628 7/1997

* cited by examiner

*Primary Examiner* — Shirley Lu
(74) *Attorney, Agent, or Firm* — Procopio Cory Hargreaves & Savitch LLP; Noel C. Gillespie

(57) ABSTRACT

The present invention comprises a radio frequency identification device that utilizes multiple operating frequencies. In one embodiment of the present invention, one frequency (e.g., an ultra-high frequency such as 915 MHz, 800 MHz, 915 MHz, or microwave frequency such as 2.45 GHz) is used for data transmission, and another frequency (e.g., a low or high frequency such as 13.56 MHz) is used for field penetration. In another embodiment, one frequency is used for reading information received from the multi-frequency identification device, and another frequency is used for writing to the multi-frequency identification device. In an additional embodiment, the multi-frequency identification device utilizes one antenna for all frequencies. In another embodiment, the multi-frequency identification device utilizes two or more antennas for different frequencies, and one common memory. In other embodiments, one or two digital parts, analog parts, antennas, and memories can be used.

17 Claims, 4 Drawing Sheets

400

405
TRANSMISSION TO TRANSPONDER AT FIRST FREQUENCY
410
RECEIPT OF FIRST TRANSMISSION BY FIRST ANTENNA
415
FIRST TRANSMISSION POWERS TRANSPONDER
420
TRANSMISSION TO TRANSPONDER AT SECOND FREQUENCY
425
RECEIPT OF SECOND TRANSMISSION BY SECOND ANTENNA

MULTI-FREQUENCY IDENTIFICATION DEVICE

Matter enclosed in heavy brackets [ ] appears in the original patent but forms no part of this reissue specification; matter printed in italics indicates the additions made by reissue.

This application claims priority to provisional U.S. Patent Application Ser. No. 60/401,762 filed Aug. 8, 2002.

This application incorporates by reference provisional U.S. Patent Application Ser. No. 60/401,762 filed Aug. 8, 2002; provisional U.S. Patent Application Ser. No. 60/394,241 filed Jul. 9, 2002 and the corresponding utility U.S. patent application Ser. No. 10/615,026, filed Jul. 9, 2003; provisional U.S. patent application Ser. No. 60/428,257 filed Nov. 22, 2002; U.S. patent application Ser. No. 10/118,092 filed Apr. 9, 2002; PCT patent application PCT/IB02/01439, filed Apr. 30, 2002; German Patent Application No. 10121126.0 filed Apr. 30, 2001; and Mexican Patent Application No. 010967 filed Oct. 26, 2001; No. 010968 filed Oct. 26, 2001; No. 010969 filed Oct. 26, 2001; No. 010971 filed Oct. 26, 2001; No. 003141 filed Mar. 25, 2002; No. 003202 filed Mar. 26, 2002; No. 004371 filed Apr. 30, 2002; No. 010364 filed Oct. 18, 2002; No. 010364 filed Oct. 18, 2002; No. 100365 filed Oct. 18, 2002; No. 010366 filed Oct. 18, 2002; and 00354 filed Dec. 16, 2002.

BACKGROUND OF THE INVENTION

Field of the Invention

The present invention relates generally to transponders and methods of using transponders, and specifically to passive radio frequency identification devices and methods of using radio frequency identification devices.

BRIEF DESCRIPTION OF THE FIGURES

Additional features and advantages of the present invention will become more apparent from the detailed description set forth below when taken in conjunction with the Figures in which like reference numbers indicate identical or functionally similar elements.

DESCRIPTION OF THE INVENTION

Figure 1:
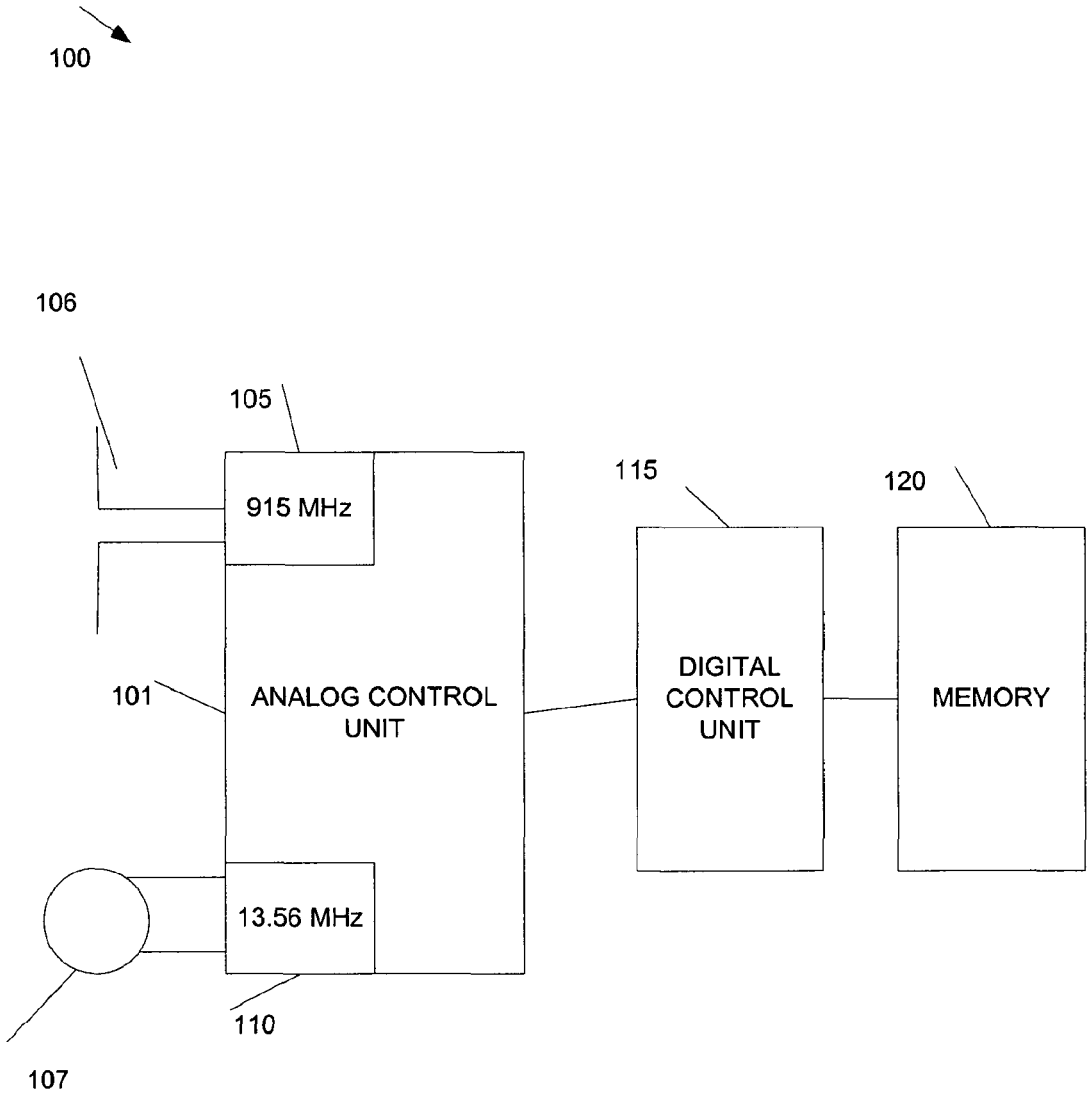
FIG. 1 illustrates a multi-frequency, or frequency-independent identification device 100 of the multi-frequency identification device, according to one embodiment of the present invention.

Passive transponder systems are used worldwide for many identification purposes. Standard frequencies are generally 125 kHz (low frequency) and 13.56 MHz (high frequency). Additionally, new frequencies in the range of 900 MHz (ultra-high frequency or UHF) (e.g., 915 MHz for USA, 868 MHz for Europe), and 2.45 GHz (microwave frequency) are also used.

Passive transponder systems have no power supply within the transponder, and are considerably less expensive than active transponders which contain other components, including a battery for power. The passive transponder is powered by an electromagnetic field of the reader. Typically a single internal antenna of the transponder is used for both data transmission and energy transmission between the reader and the transponder, using the same frequency for the data and energy transmission.

In addition, passive transponder systems are capable of "read only" or "read/write" memories, and are thus often used to perform read and write cycles.

Passive transponder systems may have multiple transmission channels, and the same frequency (e.g., 125 KHz or 13.56 MHz) is generally used for all transmissions. The maximum read/write distance of these systems is limited by the limits of data transmission and energy transmission. The energy transmission channel usually has the same frequency as the data transmission because the energy and the data are transmitted simultaneously. For example, the write channel and the energy transmission channel can use the same frequency.

Depending upon application requirements, certain operating frequencies offer advantages over other frequencies. Ultra high frequency systems, using a frequency of 915 MHz, provide a read distance that is longer than low 125 KHz or high 13.56 MHz frequencies (e.g., 5 meters v. a few feet). High frequency 13.56 MHz systems offer the security of limited broadcast range when writing sensitive data to a transponder memory. Low and high frequency systems also allow greater field penetration of fluid-containing objects, such as the human body, while ultra-high frequencies are generally blocked by these objects.

The present invention includes a radio frequency identification device that uses different operating frequencies (e.g., the most effective frequencies for different types of transmissions) in one identification device, thereby combining the respective advantages of each frequency. In one embodiment of the present invention, one frequency (e.g., a frequency such as 868 MHz or 915 MHz to 2.45 GHz) is used for data transmission, and another frequency (e.g., a low frequency such as 125 kHz) is used for proximity detection, such as in an electronic article surveillance device. In another embodiment, one frequency is used for reading information received from the identification device, and another frequency is used for writing to the identification device.

In one embodiment, the identification device utilizes one antenna for all frequencies. In another embodiment, the identification device utilizes two or more antennas for different frequencies, and one common memory. In other embodiments, one or two digital parts, one or two analog parts, and one or two antennas can be used in conjunction.

The present invention utilizes the advantages of a device (e.g., a semiconductor chip) that is frequency-independent. In one embodiment, all transponder functions, such as encode/decode, modulate/demodulate, digital and analog functions, and memory, are embodied in this single device or chip. However, these functions can also be embodied in multiple chips. In one embodiment, the present invention combines the secure and proximity features of 13.56 MHz with the long read range feature of 915 MHz or 2.45 GHz. In an additional embodiment, it is possible to utilize different security levels on different channels.

In another embodiment, the present invention integrates two high frequency (HF) or two ultra-high frequency (UHF) interfaces on one chip. These two interfaces are connected to two different antennas. Each antenna is tuned to its ideal working frequency. Thus, for example, one digital part of the chip is provided that has an ability to communicate via two HF channels through two antennas. Both channels handle the data coming from the same memory. The chip detects which field the transmission is in and automatically switches the communication to the active channel.

In other embodiments of the present invention (e.g., for multi application systems), different memory areas are used for the different frequency channels.

Multi-Frequency Identification Device

FIG. 1 illustrates multi-frequency identification device 100, according to one embodiment of the present invention. An example of a use of the present invention is vehicle registration. This example is used merely to illustrate the architectural overview of the present invention. Those experienced in the relevant art(s) will see that multiple other embodiments and uses are possible.

Electronic vehicle registration allows integration of a passive identification device into a license plate (e.g., on the license plate or on a sticker on the license plate) of a vehicle. To identify the vehicle on the road using the identification device, in some embodiments, it is preferable to have a read distance of more than 3 meters, which can be only achieved with an ultra-high frequency (e.g., 915 MHz) system.

For the write cycle to program the license plate, however, a shorter distance is sufficient, because the write cycle is typically performed only by local authorities in a nearby office. The write cycle, using 13.56 MHz, will be more secure than the read cycle in order to prevent illegal changing of the data.

The multi-frequency identification device 100 comprises: a base layer; and at least one radio frequency device comprising at least one chip and at least one antenna disposed on the at least one base layer, wherein the at least one antenna is in electrical communication with the at least one chip. In one embodiment, the chip can be a frequency-independent chip. In this case, a single manufactured silicon chip, when properly connected and matched to an appropriate antenna, will operate at any of the relevant frequencies assigned for identification devices. In other embodiments, the chip can also be a one-frequency or multi-frequency chip. In these cases, the chip is uniquely designed and characterized to operate with a specific antenna at one or a few specific frequencies.

In one embodiment, the multi-frequency identification device 100 is a radio frequency system that comprises an analog control unit 101, which is a dual interface with the combination of two frequencies: a 915 MHz or 2.45 GHz system 105; and a 13.56 MHz system 110. The 915 MHz system 105 is used, for example, for a reading data function that enables speed. In one embodiment, the 915 MHz system 105 includes a dipole antenna 106. The 13.56 MHz system 110 is used, for example, for the writing (personalization) of the identification information for the vehicle having the license plate. In one embodiment, the 13.56 MHz system 110 includes a coil antenna 107 (i.e., a wound spiral of insulated wire).

The multi-frequency identification device 100 also includes a digital control unit 115 and memory 120. The analog control unit 101 is a device or circuit that is continuously varying in signal strength or quantity, rather than based on discrete units, such as the binary digits 1 and 2. The digital control unit 115 is a device or circuit that is based on discrete units, such as binary digits 1 and 0.

Figure 2:
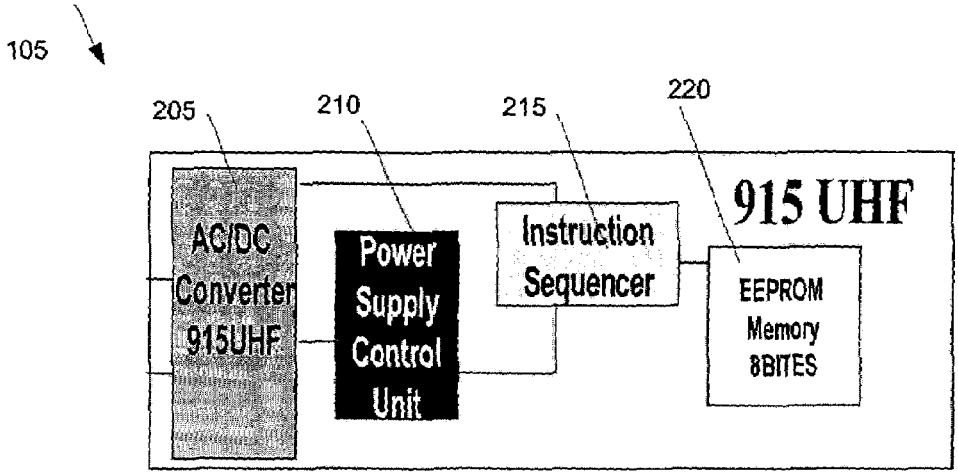
FIG. 2 illustrates 915 MHz system 105, according to one embodiment of the present invention.

FIG. 2 illustrates 915 MHz or 2.45 GHz system 105, according to one embodiment of the present invention. The 915 MHz system 105 comprises: AC/DC converter 205, power supply control unit 210, instruction sequencer 215, and memory 220. An AC/DC converter 205 is a device that receives an alternating current (AC) and converts it to direct current (DC). A power supply control 210 is a device which regulates voltage and current to protect an apparatus from power surges and low power. An instruction sequencer 215 is a device that queues instructions to be sent to a chip's internal memory. EEPROM (Electrically Erasable Programmable Read-Only Memory) memory 220 stores data. In one embodiment, the analog control unit, the digital control unit, and memory units comprise a single integrated circuit chip (e.g., the RFID chip manufactured by SCS Corporation, San Diego, Calif.).

Figure 3:
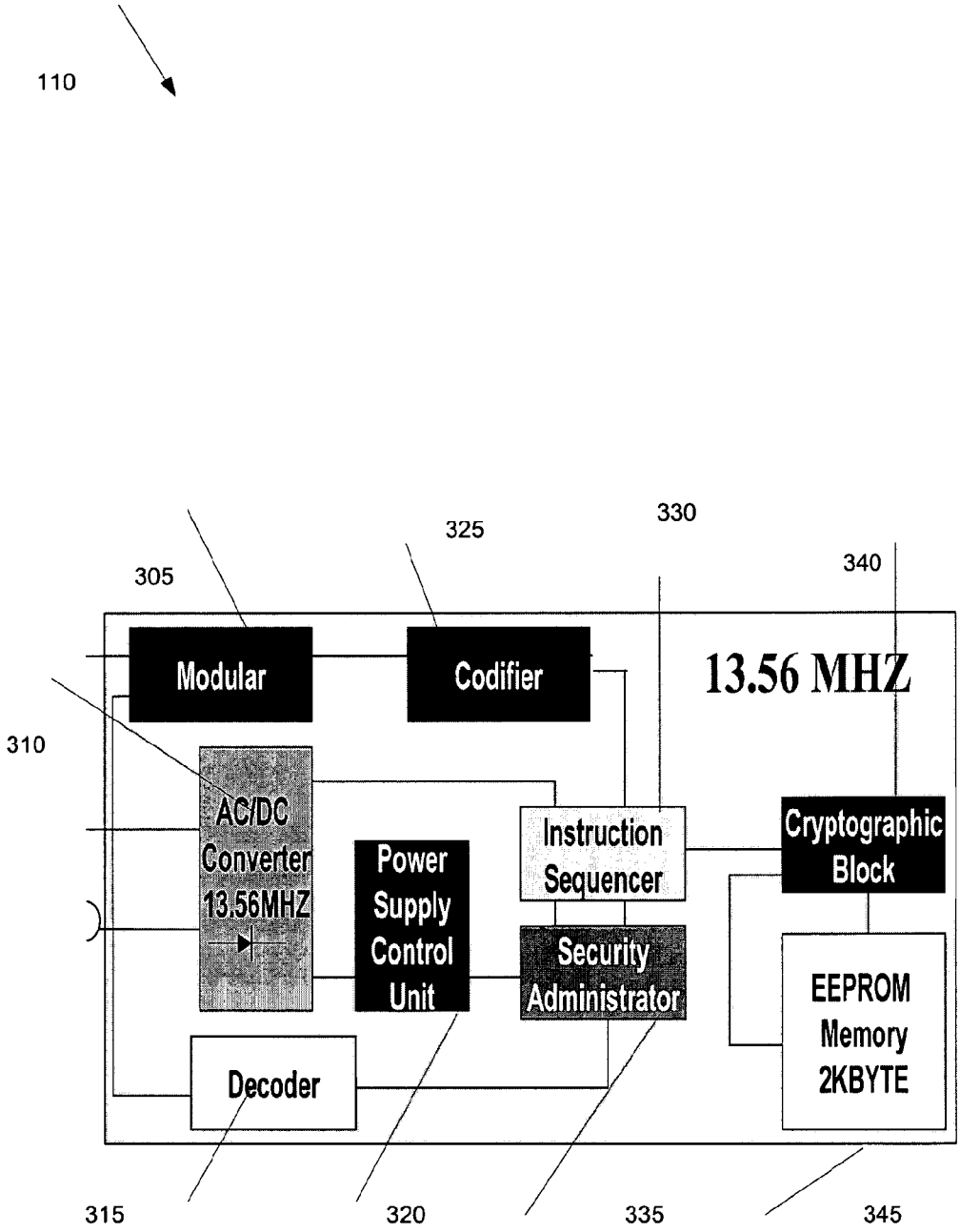
FIG. 3 illustrates 13.56 MHz system 110, according to one embodiment of the present invention.

FIG. 3 illustrates 13.56 MHz system 110, according to one embodiment of the present invention. 13.56 MHz system 110 comprises: a modulator 305, an AC/DC converter 310, a codifier 325, a decoder 315, a power supply control unit 320, an instruction sequencer 330, a security administrator 335, a cryptographic block 340, and memory 345. A modulator 305 is a device that receives baseband signals from an antenna. An AC/DC converter 310 is a device that receives an alternating current (AC) and converts it to direct current (DC). A codifier 325 is a device for encoding information received so that it may be utilized by another device or protocol. A decoder 315 is a device that decodes information from the encoder output so it may be used by another device or display. A power supply control 320 is a device which regulates voltage and current to protect an apparatus from power surges and low power. An instruction sequencer 330 is a device that queues instructions to be sent to a chip's internal memory. A security administrator 335 is a device that checks and validates the cryptographic keys that will be sent to the cryptographic block. A cryptographic block 340 is a device that stores the security keys. These keys are checked and validated to grant or deny access to the memory chip. EEPROM memory 345 stores data.

Method of Using Multi-Frequency Identification Device

Figure 4:
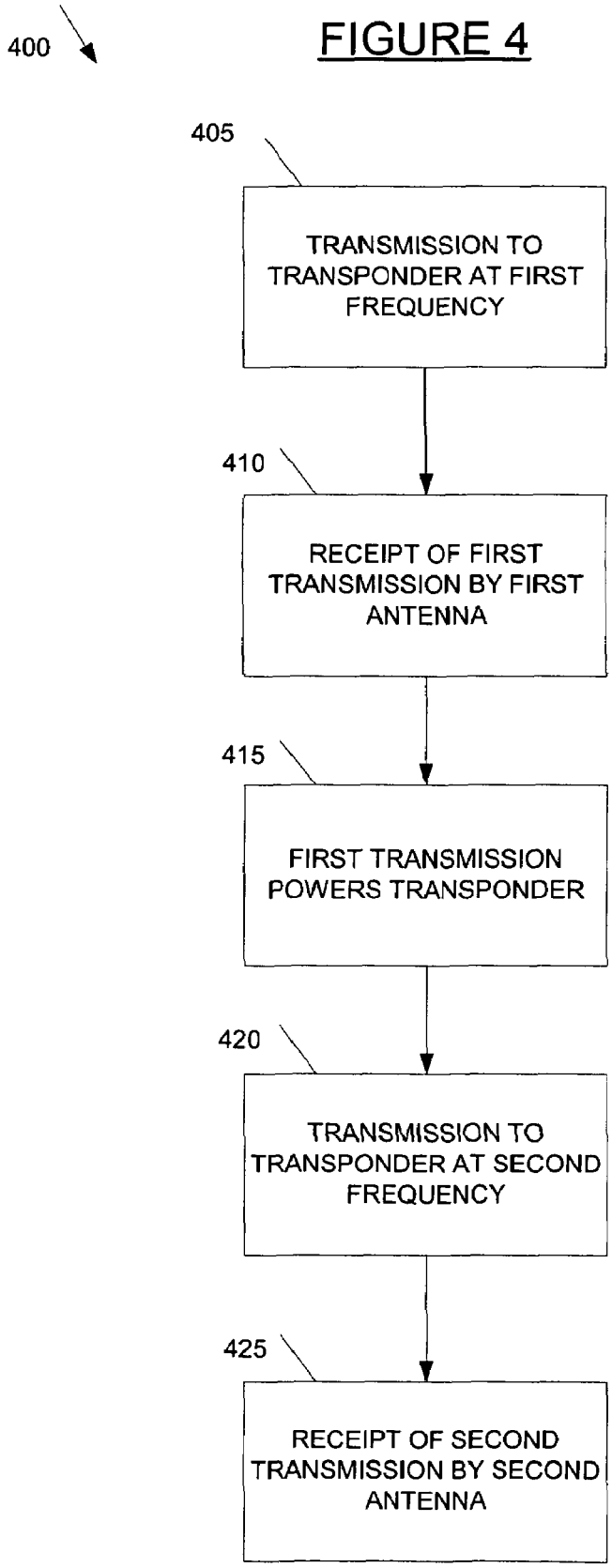
FIG. 4 illustrates a method of use 400 for the multi-frequency identification system, according to one embodiment of the present invention.

FIG. 4 illustrates a method of use 400 for the multi-frequency identification device 100, according to one embodiment of the present invention. In step 405, a first transmission at frequency 915 MHz takes place. Thus, for example, when a vehicle approaches a reader, the first transmission takes place. In step 410, the antenna 106 of the 915 MHz system 105 receives the first transmission. Thus, for example, the antenna 106 of the 915 MHz system 105, which is embedded on the vehicle license plate, receives the transmission from the reader. In step 415, the first transmission powers the multi-frequency identification device. Thus, for example, the reader's transmission powers the multi-frequency identification device on the license plate. In step 420 (e.g., when the vehicle is closer to the reader), a second transmission at frequency 13.56 MHz takes place. Thus, for example, when a vehicle approaches a reader, the second transmission takes place. In step 425, the antenna 107 of the 13.56 MHz system 110 receives the second transmission. Thus, for example, the antenna 107 of the 13.56 MHz system receives information (e.g., authorization to pass a border) from the reader/writer and stores it.

Conclusion

The present invention is described in terms of the above embodiments. This is for convenience only and is not intended to limit the application of the present invention. In fact, after reading the description of the present invention, it will be apparent to one skilled in the relevant arts how to implement the present invention in alternative embodiments.

In addition, it should be understood that the Figures described above, which highlight the functionality and advantages of the present invention, are presented for example purposes only. The architecture of the present invention is sufficiently flexible and configurable, such that it may be utilized in ways other than that shown in the Figures.

What is claimed is:

1. In [vehicle tracking] *a Radio-Frequency Identification* (*RFID*) system comprising a reader that operates on multiple [frequencies] *frequency bands* and an RFID [tag] *transponder* that operates on multiple [frequencies] *frequency bands*, a method for secure [vehicle] identification, comprising:

the [tag] *RFID transponder* engaging in a non-secure interaction with the reader over a first frequency *band, the non-secure interaction comprising a first signal modulation technique*;

the [tag] *RFID transponder* engaging in a secure interaction with the reader over a second frequency *band, the secure interaction comprising the first signal modulation technique, wherein the second frequency band limits the range of the RFID system to a shorter distance relative to the first frequency band*; and the [tag] *RFID transponder* receiving authentication based on the non-secure and secure interaction.

2. The method of claim 1, wherein the non-secure interaction comprises a read of the [tag] *RFID transponder*.

3. The method of claim 2, wherein the first frequency *band* comprises a relatively high frequency *band*, selected such that the read of the [tag] *RFID transponder* can be done over a greater distance relative to a distance associated with the interaction using the second frequency *band*.

4. The method of claim 3, wherein the first frequency *band* is 915 MHz.

5. The method of claim 1, wherein the non-secure interaction comprises a write of the [tag] *RFID transponder*.

6. The method of claim 1, wherein the secure interaction comprises a write of the [tag] *RFID transponder*.

[7. The method of claim 6, wherein the second frequency comprises a relatively low frequency, relative to a distance associated with the interaction using the first frequency, selected such that the write of the tag can be done more securely over a shorter distance.]

8. The method of claim [7] *1*, wherein the second frequency *band* is 13.56 MHz.

9. The method of claim [7] *1*, wherein the second frequency *band* is 125 KHz.

10. The method of claim 1, wherein the secure interaction comprises a read of the [tag] *RFID transponder*.

11. The method of claim 1, wherein the secure interaction can be a read or a write of the [tag] *RFID transponder*.

12. The method of claim 1, wherein the [tag] *RFID transponder* is embedded in a license plate.

13. The method of claim 1, wherein the [tag] *RFID transponder* is attached to a license plate.

14. The method of claim 1, wherein the authentication comprises authorization to pass a border.

15. The method of claim 1, wherein the non-secure interaction can be a read or a write of the [tag] *RFID transponder*.

*16. The method of claim 1, wherein the secure interaction comprises limiting the distance between the transponder and the reader to less than 3 meters.*

*17. The method of claim 1, wherein the secure interaction comprises checking and validating at least one cryptographic key.*

*18. The method of claim 1, wherein first signal modulation technique is backscatter modulation.*

* * * * *